(12) United States Patent
Delgado et al.

(10) Patent No.: US 6,642,293 B2
(45) Date of Patent: Nov. 4, 2003

(54) LEAD FREE PVC POLYMER COMPOSITION RESISTANT TO ABRASION AND HIGH OPERATION TEMPERATURES FOR INSULATION AND SHEATH OF THIN-WALLED AUTOMOTIVE CABLES

(75) Inventors: Arturo Hjort Delgado, Querétaro (MX); Alfonso Perez Sanchez, Querétaro (MX)

(73) Assignee: Servicios Condumey, Queretaro (MX)

( * ) Notice: Subject to any disclaimer, the term of this patent is extended or adjusted under 35 U.S.C. 154(b) by 0 days.

(21) Appl. No.: 09/899,754

(22) Filed: Jul. 6, 2001

(65) Prior Publication Data

US 2002/0061951 A1 May 23, 2002

(30) Foreign Application Priority Data

Nov. 22, 2000 (MX) .............................................. 0011517

(51) Int. Cl.[7] .............................. C08J 5/10; C08K 3/26; C08L 27/06
(52) U.S. Cl. ........................ 524/425; 524/275; 524/287; 524/297; 524/315
(58) Field of Search ................................. 524/425, 297, 524/287, 315, 275; 523/173

(56) References Cited

U.S. PATENT DOCUMENTS

| 5,326,638 | A | * | 7/1994 | Mottine, Jr. et al. | 428/379 |
| 5,760,113 | A | * | 6/1998 | Mitsutake et al. | 524/161 |
| 5,912,436 | A | * | 6/1999 | Sanchez et al. | 174/121 A |
| 6,291,772 | B1 | * | 9/2001 | Easter et al. | 174/102 SC |
| 6,383,700 | B1 | * | 5/2002 | Yamazaki et al. | 430/66 |

* cited by examiner

*Primary Examiner*—James J. Seidleck
*Assistant Examiner*—U. K. Rajguru
(74) *Attorney, Agent, or Firm*—Grant Patent Services; Jonathan E. Grant

(57) ABSTRACT

A lead free polyvinyl chloride polymer composition for a thin-walled automotive cable insulation and sheath, presenting abrasion strength and thermal resistance at 105° C., characterized in that it consists of a mixture of: a polyvinyl chloride with stabilizing agents, 9 to 11 carbon atom linear co-ester type plasticizers; calcium carbonate load and at least one phenol type antioxidant agent with an oxidized polyethylene type compound.

14 Claims, No Drawings

LEAD FREE PVC POLYMER COMPOSITION RESISTANT TO ABRASION AND HIGH OPERATION TEMPERATURES FOR INSULATION AND SHEATH OF THIN-WALLED AUTOMOTIVE CABLES

BACKGROUND OF THE INVENTION

1. Field of the Invention

The invention relates to a polyvinyl chloride formulation useful to insulate automotive primary cables, characterized in that it is lead free, abrasion resistant for use in insulation and sheathing of thin-walled minimum thickness automotive cables able to operate at working temperatures of 105° C.

2. Description of the State of the Art

Polyvinyl chloride, "PVC", is used extensively in electrical cables isolation and sheathing because it is economical and easily available, because of its mechanical properties, chemical and weather resistance as well as because of its dielectric properties.

However, in order to obtain some specially required characteristics, it is necessary to investigate new additives producing the desired effect.

With regard to the object of the instant invention PVC is always used in formulations through the addition of plasticizers to remove its natural stiffness and to give it flexibility as well as through the addition of other additives such as thermal stabilizers, lubricants, pigments, loads, impact modifiers as well as flame retardant agents that are added to the compound to obtain the PVC with the desired properties.

PVC itself is a thermally unstable polymer, with decomposition at a temperature of 150° C., releasing HCl, producing establishment sites in the polymer which causes the chain crosslinking and its eventual rupture resulting in the degradation of the polymer properties. As PVC decomposes, the resin changes color and becomes stiff and fragile.

To obtain the thermal stability necessary for its processing, PVC compounds always use stabilizers. The most common stabilizers are generally metals salts of organic or inorganic acids and phenols, organometallics, epoxy compounds and phosphites. In the case of compounds used for automotive primary cable insulation, Volkswagen 603 06 specification (December 1999 draft) mentions that the compounds used for thin-walled cable manufacturing should be lead free.

The automotive industry is and will be affected by the following factors:
   a). environment regulation forcing companies manufacturing automobiles to diminish the environmental impact of the vehicles both with regard to their emissions and their construction.
   b). increase in economy, safety, luxury and comfort offered by the current vehicles.

Said new requirements have forced vehicle manufacturers to carry out modifications and/or reductions both with regard to fuel consumption and the materials used in the manufacturing of the vehicles and their performance.

One of the modifications was reflected in automotive primary cables insulation through the elimination of the noxious materials found in the polymers, among them PVC, that have traditionally use lead because of electrical and cost advantages.

Besides, smaller vehicles have been designed and thus space in the different compartments has been reduced, providing less room for devices, among them for electrical connection harnesses for the connection and signaling of the equipment, said equipment being now more complex because of safety and luxury development in the car industry. For this reason, auto manufacturers have modified cable designs, diminishing the insulation wall thickness in order to reduce weight and diameter without lowering their mechanical resistant, offering thus an alternative for the numerical increase of the circuits currently required by automobiles.

Some isolated technologies are known which partially fulfill the characteristics required, either in the insulation composition or in the way the wires are manufactured or in the disposition of cable construction such as, for example: U.S. Pat. No. 5,326,638, issued to Mottine, Jr et al. relates to the sheathing of insulated communication cables with lead free PVC compositions and a metal antioxidant deactivator system in order to prevent the formation of calcium and zinc chloride affecting the electrical properties.

U.S. Pat. No. 5,149,917 issued to Sawada et al, protects conductors for automotive harness in which the conductors are compressed to reduce the total diameter of the cable, said cables are insulated with different vinyl chloride, crosslinked vinyl or crosslinked polyethylene compositions.

U.S. Pat. No. 4,734,545 issued to Susuki et al., protects compressed conductors for automotive harness insulated with thermoplastic polyurethane, providing abrasion strength.

The first above mentioned invention relates to a communication cable and the two other inventions relates to conductors used in the automotive industry that include polyurethane which promotes abrasion strength but is expensive.

DESCRIPTION OF THE INVENTION

The PVC formulation object the present invention must offer some characteristics that automotive cables should present, such as:
   Breaking tensile stress
   Breaking elongation
   Thermal resistance (oven aging)
   Resistance to different automobile fluids to which the cables are exposed (oil, gasoline, brake liquids, etc).
   Abrasion strength gage 0.35 $mm^2$=200 cycles
   Low temperature breaking strength
   Flame resistance
   Water-resistant during a long period of time All the components constituting the formulation are quality materials certified according to the following:
a PVC RESIN
   Homopolymer type PVC resin with "K" value=70 corresponding to a medium molecular weight and viscosity resin, PVC Chemical Abstracts Registry No. 9002-86-2
b PALATINOL 119 P
   Co-ester linear phthalic plasticizer containing from 11 to 9 carbon atoms, according to Chemical Abstract Registry No. 111381-91-0
c IRGANOX 1076
   Antioxidant: Octadecyl-3.5-diterbutyl-4-hydroxyhydrocinnamate, according to Chemical Abstract Registry No. 2082-79-3
d TERM CHECK 1890
   Zinc based stabilizer according to Ferro formula.
E POLYETHYLENE WAX AC-629
   Oxidized polyethylene homopolymer according to Chemical Abstract Registry No. 68441-17-8
f MICRONIZED CALCIUM CARBONATE
   Micronized calcium carbonate with stearic cover according to Chemical Abstract No. 1317-65-3 g MARK 2112
co-stabilizer and chelation phosphite according to Witco formula.

The polymer composition based on a PVC thermoplastic compound and/or on a mixture with other polymers fulfill the standard requirements of the European automobile industry such as Volkswagen 603.06 and BMW 600 14, with regard to the design of thin-walled cables and sheath, according to the following thicknesses:

Specifications

Gage 0.22 0.35 0.5 0.75 1.0 1.5 2.5 4.0 6.0 mm$^2$
Wall 0.20 0.22 0.26 0.28 0.28 0.28 0.32 0.38 0.38 thickness mm Through these wall thicknesses and characteristics of PVC and/or mixture of other polymers, abrasion strength at 105° and thermal grade 105° according to DIN are obtained. This thermal grade consists in submitting the cable to the operating temperature of 105° C. during 3000 hours, at the end of such period of time, the cable is submitted to the flexibility test through winding around a mandrel and the cable must also maintain its flexibility at −40° C. Throughout the elaboration of said composition, the use of lead stabilizers has been eliminated according the following description:

Polymer composition in parts per weight
The compound includes polyvinyl chloride, from 60 to 100 parts; a zinc stabilizing agent, from 1 to 6 parts;
A plasticizer of the linear co-ester type with 9 to 11 carbon atoms, from 10 to 40 parts;
A calcium carbonate load, from 15 to 40 parts;
And at least one phenol type antioxidant agent, from 3 to 6 parts;
And an oxidized polyethylene type lubricant compound, from 1 to 4 parts.

In order to obtain the 105° C. operation temperature and flexibility at −40° C., the use of a linear co-ester plasticizer with 9 to 11 carbon atom is required in the design of branched type compound formulation such as TOTM TIOTM, etc. However, because of their high molecular weight, said plasticizers have a leakage temperature of −20° C. which limits their use in compounds where flexibility is required at lower temperatures. Besides, in order to obtain an operation temperature of 105° C. and also a good electrical insulation both in dry environment and in water exposition at 85° C. during a period of 30 days with lead free stabilizers, the most adequate stabilizer type has been found to meet the requirements of the specification.

What is claimed is:

1. Thin walled automotive cables having a lead free polyvinyl chloride insulation and sheathing composition, said insulation and sheathing composition comprising a blend of:
   a) from about 60 to 100 parts by weight of polyvinyl chloride resin;
   b) from about 1 to 6 parts by weight of a zinc salt based thermal stabilizer;
   c) from about 15 to 50 parts by weight of a linear $C_{9-11}$ co-ester phthalic plasticizer;
   d) from about 10 to 50 parts by weight of a calcium carbonate filler;
   e) from about 0.2 to 6 parts by weight of an antioxidant, wherein said antioxidant is octadecyl 3,5-di-(tert)-butyl-4-hydroxyhydrocinnamate; and
   f) from about 1 to 4 parts by weight of lubricant, said lubricant being an oxidized polyethylene homopolymer wax, wherein said thin walled automotive cables are capable of operating at working temperatures of 105 degrees C. and wherein said composition is capable of forming an abrasion resistant cable which when subjected to operating at a temperature of 105 degrees C. for 3000 hours maintains its flexibility at −40 degrees C.

2. The thin walled automotive cables having a lead free polyvinyl chloride insulation and sheathing composition according to claim 1, wherein the composition comprises:
   a) from about 60 to 100 parts by weight of said polyvinyl chloride resin;
   b) from about 1 to 6 parts by weight of said zinc salt based thermal stabilizer;
   c) from about 15 to 40 parts by weight of said plasticizer;
   d) from about 10 to 40 parts by weight of said calcium carbonate filler;
   e) from about 0.2 to about 1.2 parts by weight of said antioxidant; and
   f) from about 1 to about 4 parts by weight of said lubricant.

3. The thin walled automotive cables having a lead free polyvinyl chloride insulation and sheathing composition according to claim 1, wherein the composition comprises:
   a) from about 60 to 100 parts by weight of said polyvinylchloride resin;
   b) from about 15 to 40 parts by weight of said calcium carbonate filler.

4. The thin walled automotive cables having a lead free polyvinyl chloride insulation and sheathing composition according to claim 1, wherein the composition comprises:
   a) from about 60 to 100 parts by weight of said polyvinyl chloride resin;
   b) from about 10 to 40 parts by weight of said calcium carbonate filler;
   c) from about 3 to 6 parts by weight of said zinc salt based stabilizer.

5. The thin walled automotive cables having a lead free polyvinyl chloride insulation and sheathing composition according to claim 4, further comprising a co-stabilizer which is a chelation phosphite.

6. The thin walled automotive cables having a lead free polyvinyl chloride insulation and sheathing composition according to claim 1, further comprising:
   a) from about 60 to 100 parts by weight of said polyvinyl chloride resin;
   b) from about 10 to 40 parts by weight of said calcium carbonate filler;
   c) from about 1 to 6 parts by weight of said zinc salt based thermal stabilizer; and
   d) from about 30 to 50 parts by weight of said plasticizer, said plasticizer being a linear $C_{9-11}$ co-ester linear phthalic plasticizer.

7. The thin walled automotive cables having a lead free polyvinyl chloride insulation and sheathing composition according to claim 6 further comprising a co-stabilizer which is a chelation phosphite.

8. The thin walled automotive cables having a lead free polyvinyl chloride insulation and sheathing composition according to claim 1 wherein the calcium carbonate filler is micronized calcium carbonate.

9. The thin walled automotive cables having a lead free polyvinyl chloride insulation and sheathing composition according to claim 1, capable of operating at working temperatures of 105 degrees C.

10. The thin walled automotive cables having a lead free polyvinyl chloride insulation and sheathing composition according to claim 1, further capable of producing an abrasion resistant cable having good electric insulation in both dry environment and water exposure at 85 degrees C. for a period of thirty days.

11. The thin walled automotive cables having a lead free polyvinyl chloride insulation and sheathing composition according to claim 1, further comprising:
   a) from about 60 to 100 parts by weight of said polyvinyl chloride resin;
   b) from about 1 to 6 parts by weight of said zinc salt based thermal stabilizer;
   c) from about 30 to about 50 parts by weight of linear $C_{9-11}$ co-ester plasticizer compound;
   d) from about 10 to 40 parts by weight of a calcium carbonate filler;
   e) from about 0.5 to 4 parts by weight said antioxidant; and
   f) from about 1 to 3 parts by weight of oxidized polyethylene lubricant compound.

12. The thin walled automotive cables having a lead free polyvinyl chloride insulation and sheathing composition according to claim 1, furthering comprising:
   a) from about 60 to 100 parts by weight of said polyvinyl chloride resin;
   b) from about 1 to 6 parts by weight of said zinc salt based thermal stabilizer;
   c) from about 30 to 50 parts by weight of said plasticizer linear $C_{9-11}$ co-ester plasticizer;
   d) from about 10 to 40 parts by weight of said calcium carbonate filler;
   e) from about 0.2 to 1.2 parts by weight of said antioxidant; and
   f) from about 1 to 3 parts by weight of said oxidized polyethylene lubricant compound.

13. The thin walled automotive cables having a lead free polyvinyl chloride insulation and sheathing composition according to claim 1, further comprising:
   a) from about 60 to 100 parts by weight of said polyvinyl chloride;
   b) from about 15 to 40 parts by weight of said calcium carbonate filler.

14. A method for the manufacture of a lead free polyvinyl chloride composition according to claim 1, comprising the following steps:
   (1) blending said polyvinyl chloride and said plasticizer in a high intensity blender;
   (2) adding said thermal stabilizer to said blender to form a dry blend;
   (3) adding said carbonate and lubricating agent to said blender;
   (4) discharging the product of step (3) in the form of a powder; and
   (5) plasticizing and granulating the product of step (4) at about 105° C. to obtain a product suitable for extrusion as insulating material and sheath for thin walled automotive cable.

* * * * *